US005097746A

United States Patent [19]
Asaoka et al.

[11] Patent Number: 5,097,746
[45] Date of Patent: * Mar. 24, 1992

[54] METERING VALVE

[75] Inventors: Masaharu Asaoka; Kazumi Ohshima, both of Saitama, Japan

[73] Assignee: Kayaba Industry Co., Ltd., Japan

[*] Notice: The portion of the term of this patent subsequent to Aug. 29, 2006 has been disclaimed.

[21] Appl. No.: 399,703

[22] Filed: Aug. 28, 1989

Related U.S. Application Data

[63] Continuation of Ser. No. 213,291, Jun. 29, 1988, Pat. No. 4,860,788.

[30] Foreign Application Priority Data

| Jun. 29, 1987 | [JP] | Japan | 62-161836 |
| Jul. 3, 1987 | [JP] | Japan | 62-102318 |
| Jul. 6, 1987 | [JP] | Japan | 62-168298 |
| Jul. 6, 1987 | [JP] | Japan | 62-168299 |
| Jul. 6, 1987 | [JP] | Japan | 62-168300 |
| Jul. 10, 1987 | [JP] | Japan | 62-173452 |
| Jul. 10, 1987 | [JP] | Japan | 62-173453 |

[51] Int. Cl.$^5$ ............................................. F15B 11/08
[52] U.S. Cl. .................................. 91/461; 91/454; 91/457; 91/452; 251/63; 137/491; 137/495
[58] Field of Search .............. 251/282, 63; 137/491, 137/492.5, 599.2, 495, 596.18, 596.2; 91/461, 454, 456, 457, 452; 60/464

[56] References Cited

U.S. PATENT DOCUMENTS

| 3,304,842 | 2/1967 | Shafer | 91/461 |
| 3,318,326 | 5/1967 | Nevuus | 137/491 |
| 3,389,796 | 6/1968 | Fiala | 251/282 X |
| 3,533,440 | 10/1970 | Berry | 137/596.18 |
| 3,771,554 | 11/1973 | Hassal | 137/491 |
| 4,065,010 | 12/1977 | Worback | 91/454 X |
| 4,167,262 | 9/1979 | Lemmon | 251/63 X |
| 4,201,052 | 6/1980 | Breeden et al. | 91/454 X |
| 4,206,688 | 6/1980 | Haak et al. | 91/454 X |
| 4,353,289 | 10/1982 | Lonnemo | 91/461 X |
| 4,548,231 | 10/1985 | Schwede | 137/492.5 X |
| 4,860,788 | 8/1989 | Asaoka | 137/491 |
| 4,936,095 | 6/1990 | Ross et al. | 60/464 X |

*Primary Examiner*—Edward K. Look
*Assistant Examiner*—Todd Mattingly
*Attorney, Agent, or Firm*—Steinberg & Raskin

[57] ABSTRACT

A metering valve adapted to operate a seat on a side of an actuator port by means of a poppet section of a main poppet arranged in a valve casing to selectively communicate the actuator port to a tank passage. The main poppet is formed with a pressure chamber on a side thereof opposite to the poppet section. The pressure chamber has a pressure receiving area substantially equal to that of the seat. Also, the main poppet is formed with a through-hole constantly communicated to the actuator port and a pilot chamber to which pilot pressure for moving the main poppet in a direction of opening the seat is applied. Thus, the metering valve is capable of stably accomplishing its control irrespective of a variation of pressure on the side of the actuator port.

8 Claims, 11 Drawing Sheets

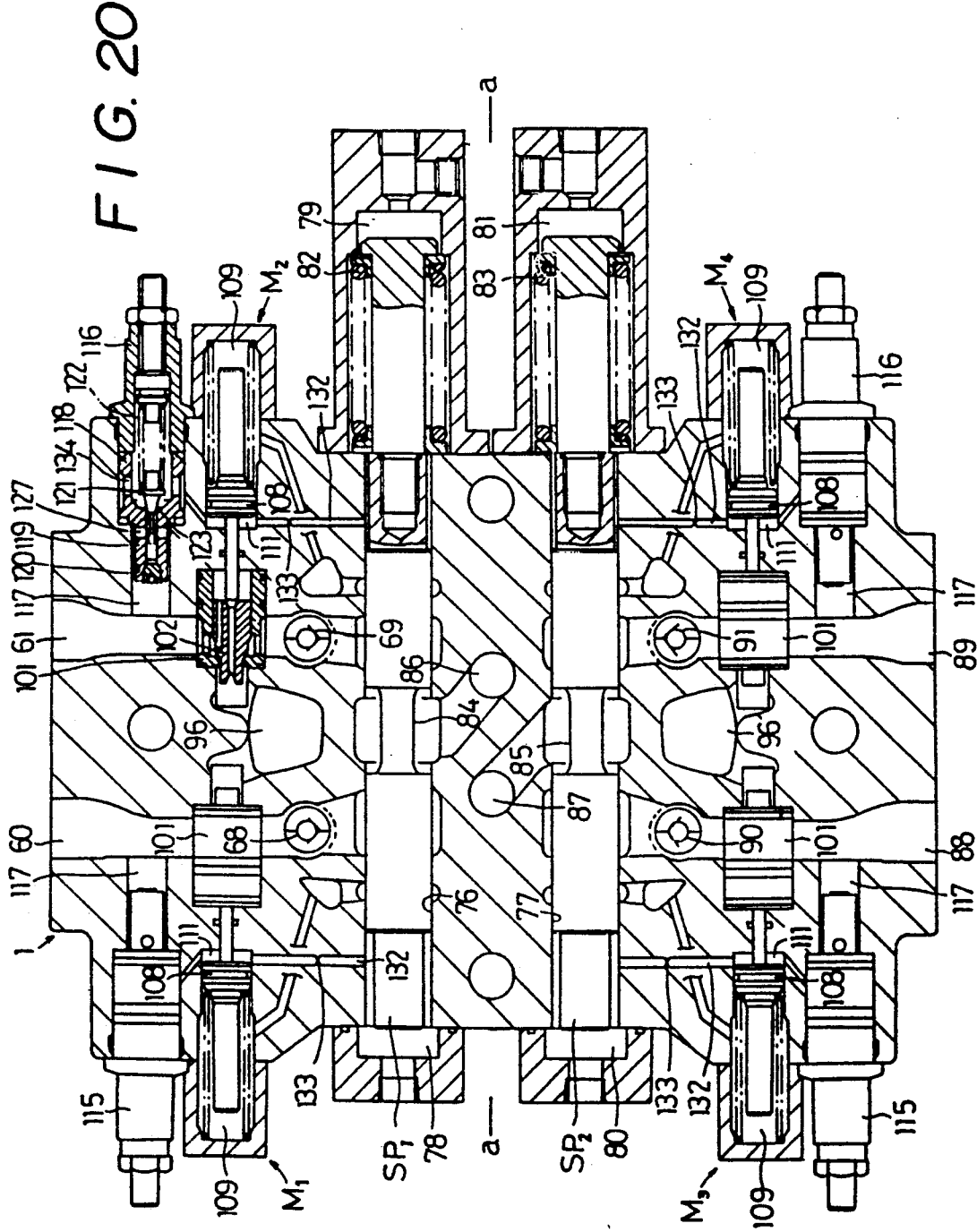

METERING VALVE

CROSS REFERENCE TO RELATED APPLICATIONS

This is a continuation of application Ser. No. 07/213,291, filed on Jun. 29, 1988, now U.S. Pat. No. 4,860,788, issued Aug. 29, 1989.

BACKGROUND OF THE INVENTION

This invention relates to a metering valve, and more particularly to a metering valve which is suitably used for meter-out control of a construction equipment, an industrial equipment, an agricultural implement or the like.

A conventional metering valve is generally constructed in such a manner as shown in FIG. 1. More particularly, the conventional metering valve includes a valve case 1 which is formed with an actuator port 2, a tank passage 3, and a piston chamber 4 coaxial with the actuator port 2 and closed with a plug 5. In the piston chamber 4 is arranged a piston body 6 in a manner to be slidable therein, and a first pilot chamber 7 is defined between the piston body 6 and the plug 5.

Also, the piston body 6 is formed on a side thereof opposite to the other side thereof facing the first pilot chamber 7 with a poppet section $6a$, which is adapted to be pressedly abutted against a seat 9 of the valve case 1 provided on a side of the actuator port 2 by action of a spring 8 arranged in the first pilot chamber 7. The piston body 6 is formed on a periphery thereof with a step $6b$ and correspondingly the piston chamber 4 is formed on an inner periphery thereof with a step $4a$ in a manner to be opposite to the step $6b$, which cooperates with the step $6b$ of the piston body 6 to define a second pilot chamber 10 therebetween.

The actuator port 2 is kept fully closed by applying a pilot pressure to the first pilot chamber 7 from pressure source (not shown) and communicating the second pilot chamber 10 to a tank (not shown). More particularly, application of the pilot pressure to the first pilot chamber 7 causes the piston body 6 to be forcedly moved in a left direction in FIG. 1, so that the poppet section 6 may be closely abutted against the seat 9. This results in communication between the actuator port 2 and the tank passage 3 being interrupted to keep the metering valve in a loaded condition.

Full opening of the actuator port 2 is accomplished by applying pilot pressure to the second pilot chamber 10 and communicating the first pilot chamber 7 to the tank. Application of the pilot pressure to the second pilot chamber 10 causes the piston body 6 to be moved against the spring 8 in cooperation with pressure acting on the poppet section $6a$ on the side of the actuator port 2. Such movement of the piston body 6 causes the poppet section $6a$ to be separated from the seat 9 to open the actuator port 2, so that the actuator port 2 may be communicated to the tank passage 3. A degree of opening of the actuator port 2 may be controlled by adjusting the pilot pressure in the second pilot chamber 10.

Unfortunately, the conventional metering valve constructed as described above has a disadvantage that a variation of pressure loaded on the side of the actuator port 2 causes meter-out control characteristics of the valve to be varied.

More particularly, for example, in FIG. 1, when pressure loaded on the side of the actuator port 2, pilot pressure applied to the second pilot chamber 10, a pressure receiving area of the poppet section $6a$ and a pressure receiving area of the second pilot chamber 10 are indicated at P1, P2, A1 and A2, respectively, force by which the piston 6 is moved in a direction indicated at an arrow 11 in the case that the actuator port 2 is to be opened is $P1 \cdot A1 + P2 \cdot A2$.

Thus, in the conventional metering valve, a variation of the pressure A1 causes a variation of force in the direction of the arrow 11, which then causes a degree of opening of the actuator port 2 to be varied, so that the valve fails to exhibit stable control characteristics.

SUMMARY OF THE INVENTION

The present invention has been made in view of the foregoing disadvantage of the prior art.

Accordingly, it is an object of the present invention to provide a metering valve which is capable of exhibiting stable control characteristics irrespective of a variation of pressure loaded on an actuator port side.

In accordance with the present invention, a metering valve is provided. The metering valve includes a valve casing, a main poppet arranged in the valve casing and provided with a poppet section, and a seat provided on a side of an actuator port in the valve casing. The poppet section of the main poppet operates the seat to selectively communicate the actuator port to a tank passage. The main poppet is formed with a pressure chamber at a portion thereof opposite to the poppet section. A pressure receiving area of the pressure chamber is defined to be substantially equal to that of the seat. Also, the main poppet is formed with a through-hole constantly communicated to the actuator port and a pilot chamber to which pilot pressure for moving the main poppet in a direction of opening the seat is applied.

Such construction of the present invention causes pressure loaded on the side of the actuator port to be also applied to the pressure chamber, so that force applied to the pressure receiving area of the seat of the actuator port may be offset by force applied to the pressure chamber. Accordingly, a variation of pressure on the side of the actuator port does not cause movement of the main poppet, resulting in a degree of opening of the main poppet being kept constant.

BRIEF DESCRIPTION OF THE DRAWINGS

These and other objects and many of the attendant advantages of the present invention will be readily appreciated as the same becomes better understood by reference to the following detailed description when considered in connection with the accompanying drawings, wherein:

FIG. 20 is a fragmentary sectional view showing an eighteenth embodiment of the present invention.

DETAILED DESCRIPTION OF THE PREFERRED EMBODIMENTS

Figure 1:
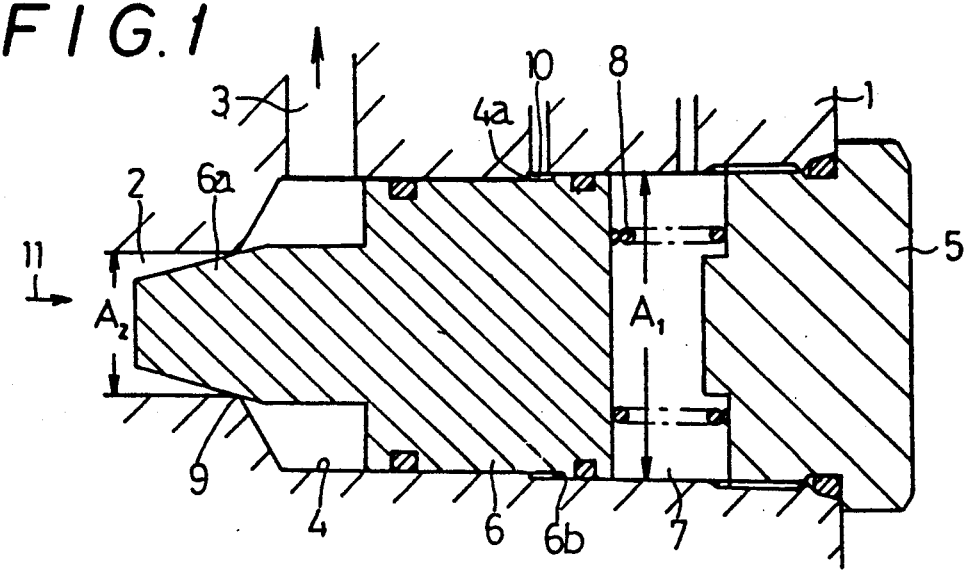
FIG. 1 is a fragmentary sectional view showing a conventional metering valve.

Now, a metering valve according to the present invention will be described hereinafter with reference to the accompanying drawings, in which like reference numerals generally designate like or corresponding parts throughout.

Figure 2:
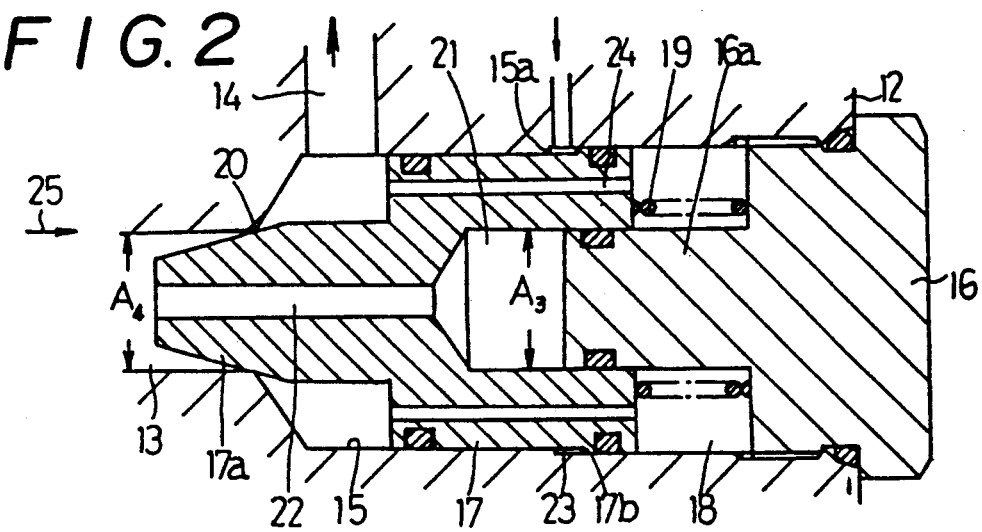
FIG. 2 is a fragmentary sectional view showing a first embodiment of a metering valve according to the present invention.

FIG. 2 shows a first embodiment of a metering valve according to the present invention. A metering valve of the first embodiment includes a valve casing 12 which is formed with an inflow port 13, an outflow port 14 and a valve hole 15 coaxial with the inflow port 13. The valve hole 15 is closed with a guide plug 16.

In the valve hole 15 is arranged a main poppet 17 in a manner to be slidable therein. Between the main poppet 17 and the guide plug 16 is defined a spring chamber 18, which is provided therein with a spring 19 exerting elastic force on the main poppet 17. The main poppet 17 is formed with a poppet section 17a on one side thereof opposite to the other side thereof facing the spring chamber 18, and the spring 19 in the spring chamber 18 acts to pressedly abut the poppet section 17a against a seat 20 provided at an interior of the valve casing 12 on a side of the inflow port 13.

The main poppet 17 is formed on the other side thereof facing the spring chamber 18 with a pressure chamber 21, in which a guide projection 16a formed on a side of the guide plug 16 facing the spring chamber 18 so as to extend through the spring chamber is inserted so that the main poppet 17 may be movable in relation to the main poppet 17. The pressure chamber 21 is adapted to be constantly communicated through a through-hole 22 to the inflow port 13. In the illustrated embodiment, a pressure receiving area A3 of the pressure chamber 21 determined depending on a diameter of the guide projection 16a is defined to be slightly larger than a pressure receiving area A4 of the inflow port 13 determined depending on a diameter of the seat 20.

The valve hole 15 is formed on an inner surface thereof with a peripheral step 15a and correspondingly the main poppet 17 is formed on an outer surface thereof with a peripheral step 17b in a manner to be opposite to the step 15a of the valve hole 15. The steps 15a and 17b cooperate with each other to define a pilot chamber 23 therebetween.

The main poppet 17 is formed with a through-hole or communication hole 24 via which the spring chamber 18 is communicated to the inflow port 14.

Now, the manner of operation of the metering valve of the first embodiment constructed as described above will be described hereinafter.

Full close of the metering valve is carried out by communicating the pilot chamber 23 to a tank (not shown). This causes pressure loaded on the inflow port 13 to be applied to both the pressure receiving areas A3 and A4, so that a difference between pressure on the area A3 and that on the area A4 cooperates with elastic force of the spring 19 to move the main poppet 17 in a left direction in FIG. 2, resulting in the poppet section 17a being contactedly abutted against the seat 20 to fully close the metering valve.

When pilot pressure is applied to the pilot chamber 23, the main poppet 17 is moved in a direction indicated at an arrow 25, so that it may be separated from the seat 20 to communicate the inflow port 13 and outflow port 14 to each other. This causes forces exerted on the pressure receiving areas A3 and A4 to be offset by each other, so that force by which the main poppet 17 is moved in the direction of the arrow 25 is determined depending on only pressure in the pilot chamber 23.

Thus, it will be noted that a variation of pressure loaded on the side of the inflow port 13 does not affect operation of the main poppet 17 at all.

Also, a degree of opening of the seat 20 on the side of the inflow port 13 can be readily controlled by merely adjusting pilot pressure applied to the pilot chamber 23, resulting in meter-out control of the metering valve being accomplished.

In the first embodiment, as described above, the pressure receiving area A4 on the side of the inflow port 13 is defined to be slightly smaller than the pressure receiving area A3 of the pressure chamber 21 (A3>A4). This is for the purpose of causing the main poppet 17 to automatically close when the pilot chamber 23 reaches tank pressure. The illustrated embodiment is not constructed so as to permit a pressure receiving area of the pilot chamber 23 to be enlarged, accordingly, a spring which generates large elastic force cannot be used as the spring 19. In view of this respect, in the first embodiment, the relationship of A3>A4 is established to ensure that the seat 20 is positively closed when the pilot chamber 23 reaches the tank pressure.

In the case that the main poppet 17 can be moved by the action of pilot pressure in the pilot chamber 23 even if the spring 19 generates large elastic force, the pressure receiving area A3 may be equal to the pressure receiving area A4 (A3=A4).

In any event, the first embodiment effectively prevents control characteristics of the metering valve from being unstable due to a variation of pressure on the side of the inflow port 13.

Figure 3:
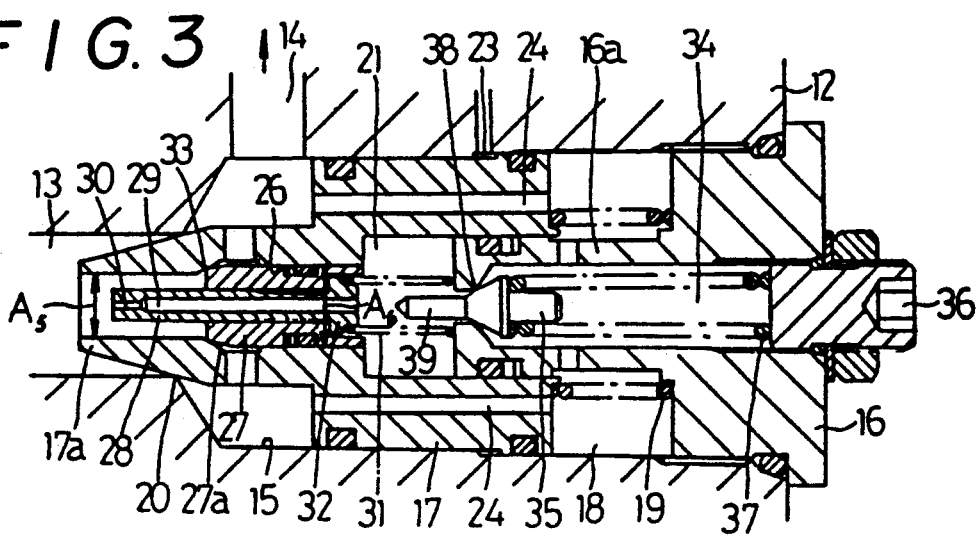
FIG. 3 is a fragmentary sectional view showing a second embodiment of a metering valve according to the present invention.

FIG. 3 shows a second embodiment of a metering valve according to the present invention. A metering valve of the second embodiment is so constructed that a relief poppet 27 is slidably inserted in a hole 26 formed at a poppet section 17a of a main poppet 17 and a control piston 28 is slidably inserted in the relief poppet 27. The control piston 28 is formed with a through-hole 29 so as to extend along a central axis thereof, and the through-hole 29 is formed at a tip end thereof with an orifice 30.

The control piston 28 is so arranged that its inner end faces a pressure chamber 21 as in the first embodiment described above. Between the inner end of the control piston 28 and a guide projection 16a of a guide plug 16 received in the pressure chamber 21 is interposed a spring 31, which serves to pressedly abut a flange 32 formed at the inner end of the control piston 28 against the relief poppet 27. When the flange 32 of the control piston 28 is thus pressedly abutted against or contacted with the relief poppet 27, the spring 31 also acts on the relief poppet 27. This causes the relief poppet 27 to be pressedly contacted at a tip end of an inclination portion 27a thereof with a seat 33 formed on an inner surface of the hole 26. The so-constructed relief poppet 27 causes a pressure receiving area A5 on a side of an inflow port 13 to be slightly or somewhat larger than a pressure receiving area A6 on a side of the pressure chamber 21.

Also, the guide plug 16 is formed with a hollow portion 34 extending along a central axis thereof, in which a pilot poppet 35 is inserted. The pilot poppet 35 is normally pressedly contacted with a seat 38 formed on an inner surface of the hollow portion 34 by the action of a spring 37 interposed between the pilot poppet 34 and an adjustment bolt 36. Also, the pilot poppet 35 is provided at a tip end thereof with a needle 39, which is formed so as to be coaxial with the control piston 28.

The remaining of the second embodiment may be constructed in substantially the same manner as the first embodiment described above.

Meter-out control of the metering valve of the second embodiment is carried out in the same manner as that of the first embodiment described above. The main poppet 17 is controlled by the action of pilot pressure applied to the pilot chamber 23 to operate the seat 20. When pressure on the side of the inflow port 13 reaches a predetermined value or more while tank pressure is applied to the pilot chamber 23 to close the seat 20, the pressure acts on the pilot poppet 35 to push it, to thereby cause fluid in a pressure chamber 21 to be supplied from a spring chamber 18 through a communication hole or through-hole 24 to an outflow port 14. Also, the fluid flows through the orifice 30 of the control piston 28 to produce a difference in pressure between both sides of the control piston 28. This causes the relief poppet 27 to be moved together with the control piston 28 against the spring 31 to open the seat 33, so that pressure on the side of the inflow port 13 may be kept below the predetermined value.

When pressure on the side of the inflow port 13 is rendered negative while an actuator is being actuated, tank pressure of the outflow port 14 acts on the inclination portion 27a of the relief poppet 27 to open the relief poppet 27, so that fluid on the side of the outflow port 14 may flow toward the inflow port 13, resulting in the negative pressure being eliminated.

Thus, it will be noted that the second embodiment functions as both a relief valve and a suction valve.

Figure 4:
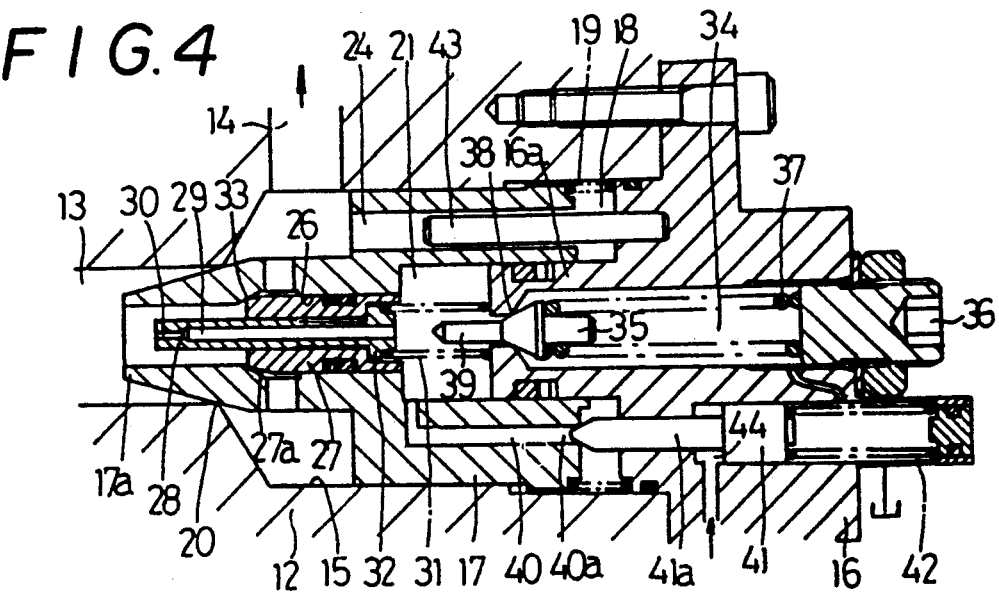
FIG. 4 is a fragmentary sectional view showing a third embodiment of a metering valve according to the present invention.

FIG. 4 shows a third embodiment of a metering valve according to the present invention. In a metering valve of the third embodiment, the pilot chamber 23 in the second embodiment described above is eliminated therefrom and a pressure chamber 21 is communicated to a spring chamber 18 through an outflow passage 40 formed at a main poppet 17. Also, the metering valve includes a servo piston 41 which has a poppet section 41a arranged opposite to an open end 40a of the outflow passage 40. Also, the valve includes a spring 42 which acts on an end of the servo piston 41 opposite to the poppet section 41a to cause the poppet section 41a to normally close the open end 40a of the outflow passage 40. Reference numeral 43 designates a stopper pin for preventing rotation of the main poppet 17 and a hole in which the pin 43 is inserted also exhibits the same function as the through-hole 24 in the second embodiment described above.

The remaining of the third embodiment may be constructed in substantially the same manner as the second embodiment.

In the third embodiment constructed as described above, meter-out control of the metering valve is carried out by applying pilot pressure to a pilot chamber 44 of the servo piston 41 to move the piston 41 against the spring 42. At this time, the servo piston 41 is stopped at a position at which pressure in the pilot chamber 44 is balanced with elastic force of the spring 42. When the servo piston 41 is thus moved, the poppet section 41a of the piston 41 is separated from the open end 40a of the outflow passage 40 to open it, so that fluid in the pressure chamber 21 may be supplied from the outflow passage 40 through the spring chamber 18 and communication hole or through-hole 24 to an outflow port 14. This causes a difference in pressure between both sides of an orifice 30 to be produced to move the main poppet 17 against the spring 19.

Such movement of the main poppet 17 opens a seat 20 to cause fluid on a side of an actuator port 13 to flow to the outflow port 14 and concurrently approach the poppet section 41a to the open end 40a of the outflow passage 40, so that a degree of restriction of the end 40 may be varied to correspondingly vary pressure in the pressure chamber 21.

This causes the main poppet 17 to be stopped at a position at which a difference in pressure on both sides of the orifice 30 is balanced with elastic force of the spring 19 to determine a degree of opening of the seat 20. At this time, even when pressure loaded on the side of the inflow port 13 is varies, the variation is also transmitted to the pressure chamber 21. Accordingly, the meter-out control is never affected by the variation.

The metering valve of the third embodiment functions also as both a relief valve and a suction valve as in the second embodiment.

Figure 5:
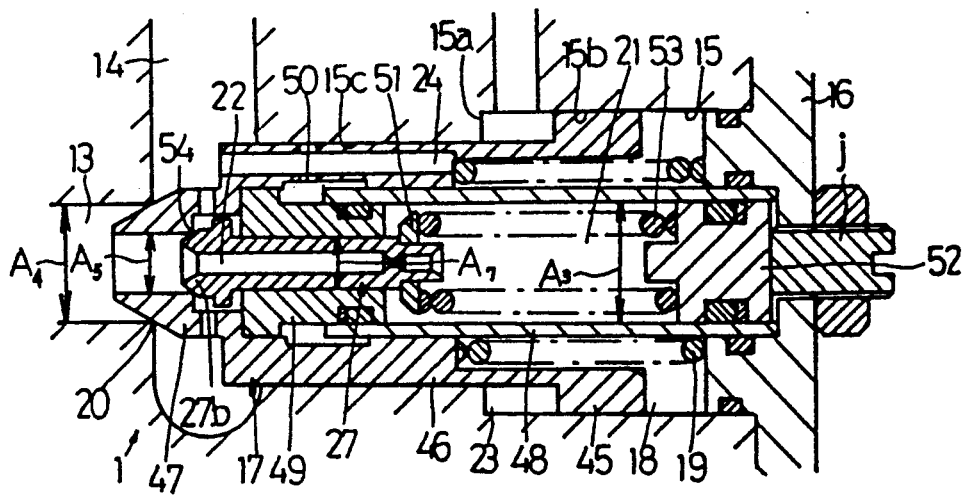
FIG. 5 is a fragmentary sectional view showing a fourth embodiment of a metering valve according to the present invention.

FIG. 5 shows a fourth embodiment of a metering valve according to the present invention. A metering valve of the fourth embodiment is so constructed that a valve casing 12 is formed with a valve hole 15, of which an outer end is opened to a side surface of the casing 12 and an inner end is opened to an outflow port 14. The valve hole 15 comprises an outside section 15b of a large diameter and an inside section 15c of a small diameter which are connected together through a step 15a formed therebetween.

In the valve hole 15 is slidably inserted a main poppet 17 which comprises an annular projecting section 45, a cylindrical section 46 of a diameter smaller than that of the annular projecting section 45 and a poppet section 47 formed on a tip end of the cylindrical section 46 so as to extend therefrom. The valve hole 15 in which the main poppet 17 is arranged is closed at its outer open end with a plug 16, on which one end of a guide cylinder 48 is fitted.

The main poppet 17 inserted in the valve hole 15 is slidably contacted at its annular projecting section 45 with the outside section 15b of the valve hole 15 and at an outer periphery of its cylindrical section 46 with the inside section 15c of the valve hole 15. The main poppet 17 is formed therein with a hollow portion, in which a support member 49 slidably contacted with the guide cylinder 48 is fitted.

A spring chamber 18 is formed between the main poppet 17 and the plug 16 on an outside of the guide cylinder 48 and a spring 19 is arranged in the spring chamber 18. The spring 19 acts so as to cause the poppet section 47 to be pressedly contacted with a seat 20 on a side of an inflow port 13 formed in the valve casing 12. The spring chamber 18 is constantly communicated to the outflow port 14 through a through-hole or communication hole 24 formed in the main poppet 17. Also, the main poppet 17 is formed with a small hole 50, through which a portion of the support member 49 fixedly fitted in the main poppet 17 is communicated to the communication hole 24 to prevent pressure from being shut in a space between the fitted portion of the support member 49 and the guide cylinder 48.

In the illustrated embodiment, a pilot chamber 23 is defined by cooperation between the annular projecting section 45 of the main poppet 17 and the step 15a of the valve hole 15. The main poppet 17 is moved against the spring 19 depending on pilot pressure introduced to the pilot chamber 23.

In the support member 49 fitted in the main poppet 17 is slidably inserted a relief poppet 27, which is formed at one end thereof with a poppet section 27b outwardly projected from the support member 49 and is inserted at the other end thereof in the guide cylinder 48. On the other end of the relief poppet 27 is fitted a spring bearing 51 and a spring 53 is interposedly arranged between the spring bearing 51 and a sliding member 52 provided on a side of the plug 16. Thus, the spring 53 acts to abut the poppet section 27b of the relief poppet 27 against a seat 54 formed at the main poppet 17.

Also, the relief poppet 27 is formed with a through-hole 22 extending along a central axis thereof, through which a pressure chamber 21 in the guide cylinder 48 is communicated to the inflow port 13. In the illustrated embodiment, a pressure receiving area A3 on a side of the pressure chamber 21 is defined to be slightly larger than a pressure receiving area A4 of the main poppet 17 on the side of the inflow port 13 (A4≈A3 or A4<A3). Also, a pressure receiving area A5 of the relief poppet 27 on a side of the seat 54 is defined to be larger than a pressure receiving area A7 on the side of the pressure chamber 21.

Pressure on the side of the inflow port 13 acts on both pressure receiving areas A4 and A3. However, as described above, the area A3 is slightly larger than the area A4; accordingly, when pressure in the pilot chamber 23 is zero, the action of pressure on a difference between the areas A3 and A4 and elastic force of both springs 19 and 53 cooperate together to abut the poppet section 47 against the seat 20 to interrupt communication between the inflow port 13 and the outflow port 14.

Application of pilot pressure to the pilot chamber 23 in the main poppet 17 causes the main poppet 17 to overcome the above-described force to move in a right direction in FIG. 5, resulting in the seat being opened 20. A degree of opening of the seat 20 is proportional to the action of pilot pressure applied to the pilot chamber 23.

When pressure on the side of the inflow port 13 reaches a predetermined value or more, force acting on the pressure receiving area A5 overcomes force acting on the pressure receiving area A7 and elastic force of the spring 53 to open the relief poppet 27, resulting in pressure on the side of the inflow port 13 being restricted below the predetermined value. Elastic force of the spring 53 may be adjusted through an adjustment bolt j.

As described above, the metering valve of the fourth embodiment is so constructed that the relief poppet is arranged in the metering valve. Such construction permits the metering valve to be small-sized to decrease a space required to arrange the valve therein and readily assembled, as compared to arrangement of the poppet outside the valve. Also, in the illustrated embodiment, the relief poppet 27 is constructed in a manner to be the differential area type, resulting in the spring being small-sized.

Figure 6:
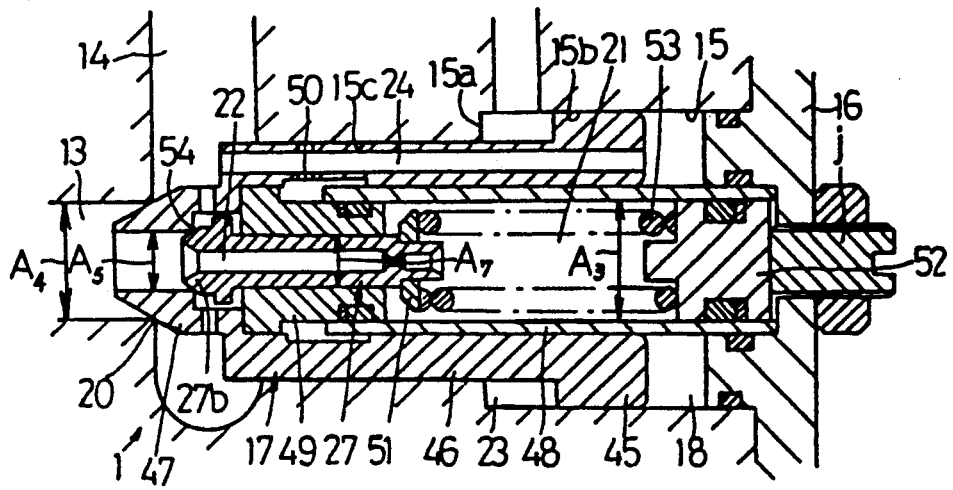
FIG. 6 is a fragmentary sectional view showing a fifth embodiment of a metering valve according to the present invention.

FIG. 6 shows a fifth embodiment of a metering valve according to the present invention. A metering valve of the fifth embodiment is constructed in substantially the same manner as the fourth embodiment described above, except that the spring 19 in the fourth embodiment is eliminated.

In the fifth embodiment, a pressure receiving area A3 is defined to be larger than a pressure receiving area A4, accordingly, application of pressure to both pressure receiving areas A3 and A4 causes a main poppet 17 to automatically close. Thus, the pressure and elastic force of a spring 53 cooperate together to keep the main poppet 17 at a normal position shown in FIG. 6.

Figure 7:
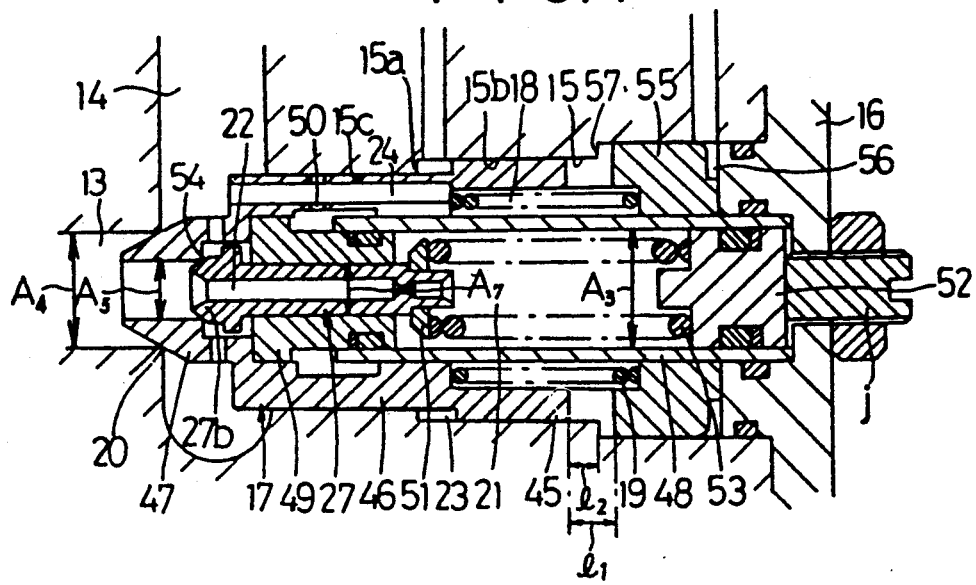
FIG. 7 is a fragmentary sectional view showing a sixth embodiment of a metering valve according to the present invention.

FIG. 7 shows a sixth embodiment of a metering valve according to the present invention. A metering valve of the sixth embodiment is so constructed that a piston 55 is arranged in a spring chamber 18 and pilot pressure for actuating another actuator is applied to a pilot chamber 56 partitioned by the piston 55. A portion of a valve hole 15 at which the spring chamber 18 is provided is formed on an inner surface thereof with a step 57 acting as a stopper. Thus, when pilot pressure is not applied to the pilot chamber 56, a spring 19 acts to keep the piston 55 at a normal position shown in FIG. 7. When the piston 55 is at the normal position, the main poppet 17 has a maximum stroke indicated at l1 in FIG. 7. When pilot pressure is applied to the pilot chamber 56 to move the piston 55 to a position at which it is abutted against the stopper 57, the main poppet 17 has a maximum stroke l2. As is apparent from FIG. 7, the maximum stroke l1 is defined to be larger than the maximum stroke l2 (l1>l2); accordingly, application of pilot pressure to the pilot chamber 56 causes a degree of opening of the main poppet 17 to be decreased. Thus, it will be noted that a degree of the opening is controlled depending on a position to which the piston is moved.

Accordingly, when the metering valve of the sixth embodiment is used for a power shovel, an inflow port 13 is connected to an arm cylinder of small load and pilot pressure is applied to a pilot chamber 23 to actuate the arm cylinder. Also, pilot pressure is applied to the pilot chamber 56 on the side of the piston 55 to actuate a swing motor of large load. This permits a flow rate on the side of the arm cylinder to be restricted when the arm cylinder and swing motor different in load are actuated by the same pump, so that the swing motor may be positively driven.

The remaining of the sixth embodiment may be constructed in substantially the same manner as the fourth and fifth embodiments described above.

Figure 8:
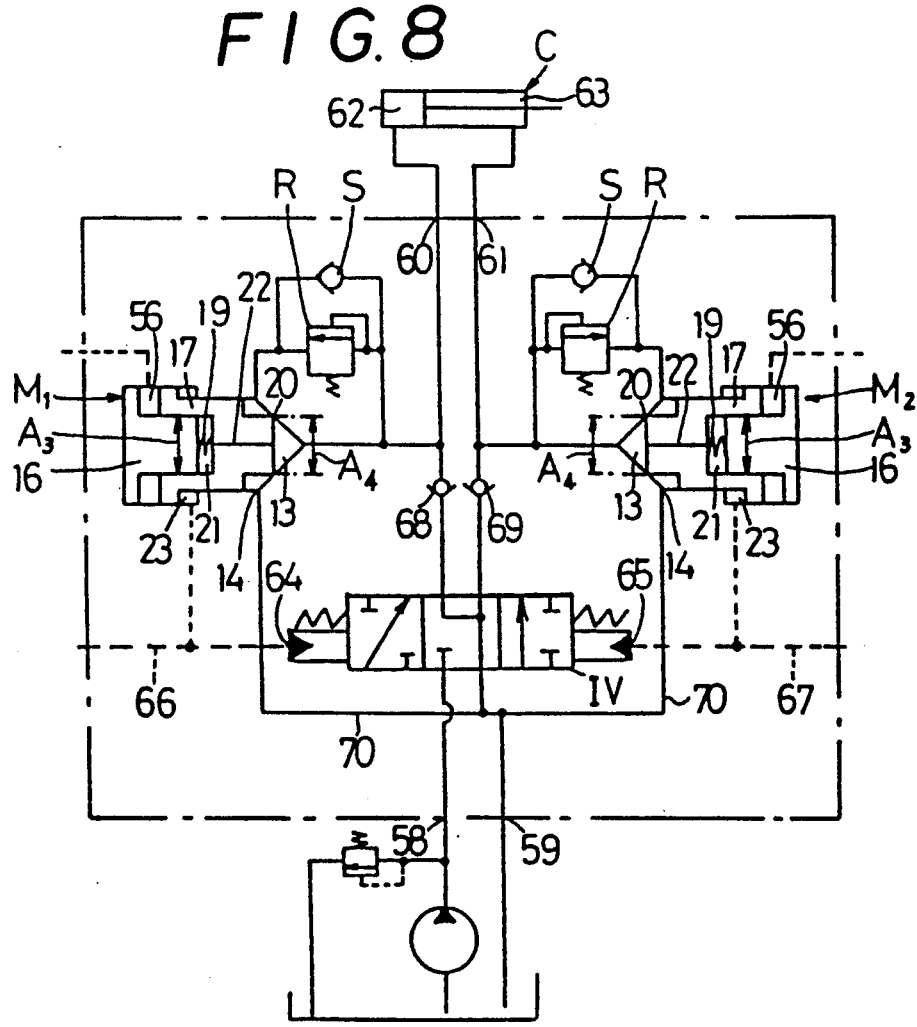
FIG. 8 is a circuit diagram showing an example of a circuit for a metering valve according to the present invention.

FIG. 8 shows a common circuit for seventh to ninth embodiments described hereinafter with reference to FIGS. 9 to 11. A valve casing 1 is provided with a meter-in valve IV and a pump port 58 and a tank port 59 are formed on an upstream side of the meter-in valve IV. Also, the meter-in valve IV is formed on a downstream side thereof with actuator ports 60 and 61, which are communicated to a chamber of a bottom side of an arm cylinder C and a chamber 63 on its rod side, respectively.

The meter-in valve IV is connected at both ends of a spool portion thereof to pilot chambers 64 and 65, to which pilot pressure is applied from pilot lines 66 and 67, respectively. The actuator ports 60 and 61 are provided with check valves 68 and 69, respectively, which are adapted to be communicated to the arm cylinder C only from a side of the meter-in valve IV.

The valve casing 1 is provided with a pair of metering valves M1 and M2 which are constructed in the same manner. Each of the metering valves M1 and M2 includes a main poppet 17 and a guide plug 16, between which a pressure chamber 21 is defined, and a spring 19 arranged on the chamber 21 so as to act thereon. The pressure chamber 21 has a pressure receiving area A3 slightly larger than a pressure receiving area A4 determined depending on a diameter of a seat 20. Also, the pressure chamber 21 is communicated through a communication hole 22 to an inflow port 13, which is then communicated to the actuator ports 60 and 61 on a downstream side of each of the check valves 68 and 69. Accordingly, pressure in the actuator ports 60 and 61 acts on both pressure receiving areas A3 and A4. Action of pressure on the pressure receiving areas causes pressure in the pressure chamber 21 to overcome it because of A3>A4. This results in the pressure and elastic force of the spring 19 forcing the main poppet 17 toward the seat 20.

Each of the metering valves M1 and M2 is also provided with first and second pilot chambers 23 and 56. Force applied to the first pilot chamber 23 causes the main poppet 17 to be moved in its open direction and force applied to the second pilot chamber 56 causes it to be moved in its closed direction. Accordingly, stroke of the main poppet 17 obtained when pilot pressure is applied to both pilot chambers 23 and 56 is caused to be different from that obtained when it is applied to only the first pilot chamber 23.

The first pilot chamber 23 is communicated to the pilot chambers 64 and 65 of the meter-in valve IV, whereas the second pilot chamber 56 is communicated to a pilot chamber of a meter in valve on a side of a swing motor (not shown).

For example, application of pilot pressure to the pilot chamber 65 of the meter-in valve IV causes the meter-in valve IV to be changed over to a right-side position. Accordingly, pressure fluid guided to the pump port 58 is then supplied from the check valve 68 through the actuator port 60 to the bottom side chamber 62 of the arm cylinder C. At this time, pilot pressure applied to the pilot chamber 65 of the meter-in valve IV is also applied to the pilot chamber 23 of the metering valve M2, so that the main poppet 17 of the metering valve M2 is moved in a right direction in FIG. 8 to open the seat 20. This causes fluid in the rod side chamber 63 to be returned to a tank through the actuator port 61, the inflow port 13, the outflow port 14, a tank passage 70 and the tank port 59 in order.

When the swing motor (not shown) is actuated in such a condition as described above, pilot pressure on a side of the swing motor is applied to the second pilot chamber 56 of the metering valve M2. At this time, pressure applied to the first pilot chamber 23 is offset by pressure applied to the second pilot chamber 56, so that movement of the main poppet 17 is reduced to decrease a degree of opening of the seat 20. This causes a flow rate of fluid returned to the arm cylinder C to be controlled to increase load of the arm cylinder C. Such increase in load of the arm cylinder leads to driving of the swing motor.

In FIG. 8, reference characters R and S indicate a relief valve and a suction valve, respectively.

Figure 9:
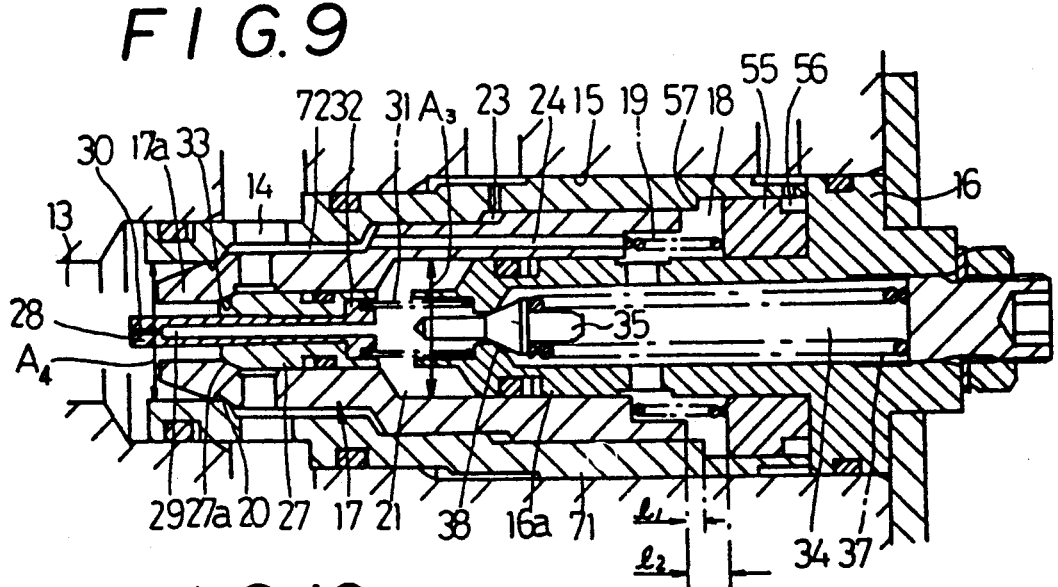
FIG. 9 is a fragmentary sectional view showing a seventh embodiment of the present invention.
Figure 10:
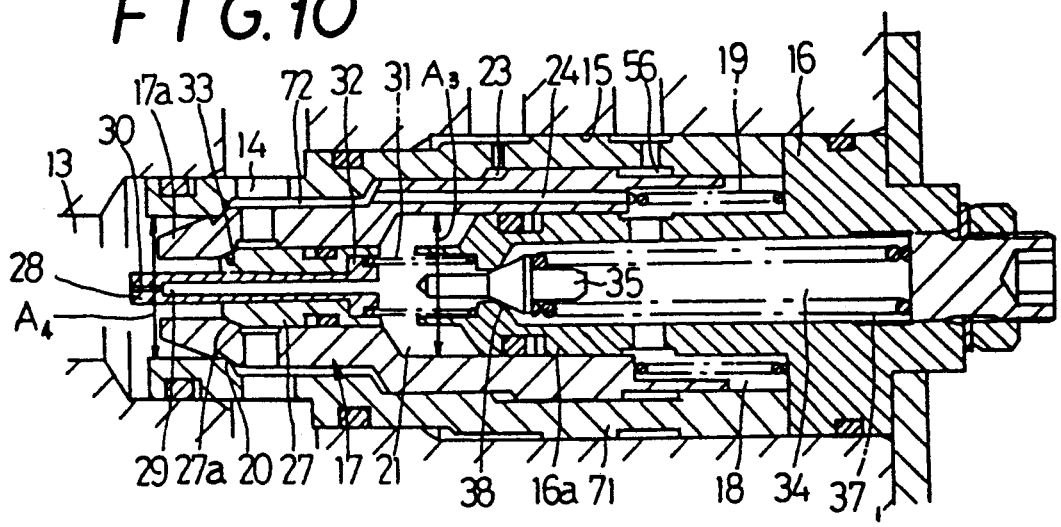
FIG. 10 is a fragmentary sectional view showing an eighth embodiment of the present invention.
Figure 11:
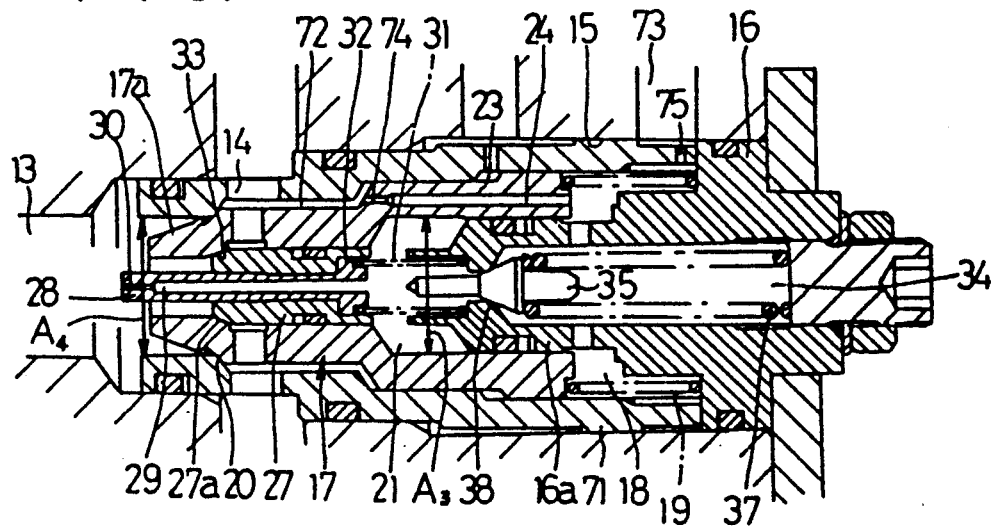
FIG. 11 is a fragmentary sectional view showing a ninth embodiment of the present invention.

FIGS. 9 to 11 shows seventh to ninth embodiments of the present invention in each of which the construction of the metering valve described above with reference to FIG. 8 is embodied. A metering valve embodied in each of the embodiments is adapted to be connected in such a manner as shown in FIG. 8.

A metering valve of the seventh embodiment shown in FIG. 9 is constructed in such a manner that a cylindrical body 71 is fittedly mounted in a valve hole 15 formed in a valve casing 12 and a guide plug 16 is fitted in an outer end of the cylindrical body 71 to hold it thereon, to thereby prevent the cylindrical body 71 from being released from the valve hole 15. In the cylindrical body 71 is arranged a main poppet 17, which is formed therein with a hollow portion through which the main poppet 17 is slidably fitted on a guide section 16a of the guide plug 16. Around the guide section 16a of the guide plug 16 is defined a piston chamber, in which a piston 55 is slidably inserted. A first pilot chamber 56 is defined on an outside of the piston 55 and a spring chamber 18 is defined on its inside. Between the main poppet 17 and the piston 55 in the spring chamber 18 is interposed a spring 19. A portion of the cylindrical body 71 positioned in the spring chamber 18 is formed on an inner surface thereof with a step 57 serving as a stopper, which is adapted to regulate a maximum stroke of the piston 55.

The spring chamber 18 is communicated to an outflow port 14 through a communication hole 24 formed at the main poppet 17 and a flow passage 72 formed between the main poppet 17 and the cylindrical body 71. Around an outer periphery of the main poppet 17 is defined a second pilot chamber 23. Also, in the main poppet 17 is slidably inserted a relief poppet 27, which exhibits the same function as that in the second embodiment described above.

The manner of operation of the metering valve of the seventh embodiment will be described hereinafter.

When a swing motor (not shown) is driven, pilot pressure for the swing motor is applied to the second pilot chamber 56 to move the piston 55 to a position at which it is contacted with the stopper 57.

Then, pilot pressure for actuating an arm cylinder C is applied to a pilot chamber of a meter-in valve, the pilot pressure is applied to the second pilot chamber 23 to move the main poppet 17 to an open direction or in a right direction in FIG. 9. However, when the piston 55 is contacted with the stopper 57 as described above, movement of the main poppet 17 is limited to a distance indicated at 11 in FIG. 9. This causes a degree of opening of a seat 20 to be reduced to correspondingly regulate outflow of fluid from the arm cylinder C.

When the swing motor is not driven, pilot pressure is not applied to the second pilot chamber 56, so that the piston 55 is kept at a position shown in FIG. 9. A maximum stroke of the main poppet 17 obtained at this time is indicated at 12 in FIG. 9, which is larger than 11. Thus, it will be noted that the metering valve of the embodiment carries out the same function as that of the sixth embodiment described above. The metering valve of the embodiment likewise serves as both a relief valve and a suction valve as in the second embodiment described above.

A metering valve of the eighth embodiment shown in FIG. 10 is so constructed that the piston 55 in the seventh embodiment is eliminated therefrom and a second pilot chamber 56 is defined around a main poppet 17 in a manner to be opposite to a first pilot chamber 23. The first pilot chamber 23 has a pressure receiving area defined to be larger than that of the second pilot chamber 56. Accordingly, in the embodiment, application of pilot pressure to only the first pilot chamber 23 causes the main poppet 17 to be moved depending on the pilot pressure to determine a degree of opening of a seat 20.

On the contrary, application of pilot pressure to both pilot chambers 23 and 56 causes the main poppet 17 to be moved in its open direction. However, the pressure applied to the first pilot chamber 23 is relatively decreased by the pressure applied to the second one 56. This results in movement of the main poppet 17 to be decreased as compared to that obtained due to application of pilot pressure to only the first pilot chamber 23, so that a degree of opening of the seat 20 may be reduced correspondingly. Accordingly, actuation of the arm cylinder concurrent with driving of the swing motor causes load on a side of the arm cylinder to be increased, so that the swing motor may be preferentially driven.

The remaining of the eighth embodiment may be constructed in substantially the same manner as the seventh embodiment.

A metering valve of the ninth embodiment shown in FIG. 11 is so constructed that the piston 55 in the seventh embodiment described above is eliminated, and a port 73 for introducing pilot pressure to a spring chamber 18 is formed with a first orifice 75 and a communication hole 24 for communicating the spring chamber 18 to an outflow port 14 is formed with a second orifice 74. The remaining of the ninth embodiment may be constructed in substantially the same manner as the eighth embodiment described above. In the so-constructed metering valve, when fluid is flowed from the port 73 to the pilot chamber 18, pressure is produced between the first orifice 74 and the second orifice 75 or in the spring chamber 18, which is opposed to working force in the first pilot chamber 23. Thus, in the embodiment, the spring chamber 18 serves as a second pilot chamber.

Figure 12:
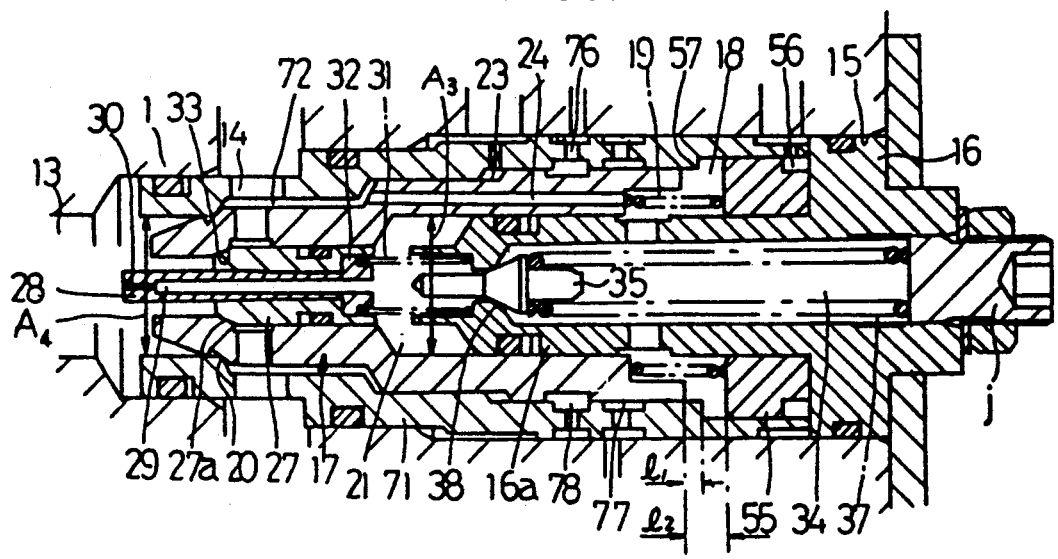
FIG. 12 is a fragmentary sectional view showing a tenth embodiment of the present invention.

FIG. 12 shows a metering valve of a tenth embodiment according to the present invention, wherein a cylindrical body 71 is formed on an outer periphery thereof with an inlet 76 and an outlet 77 for pilot pressure and the like, which are arranged in a manner to be spaced at a small distance from each other in an axial direction of the cylindrical body 71. Also, a main poppet 17 is formed with an annular groove 78, so that when it is at such a normal position shown in FIG. 12, communication between the inlet 76 and the outlet 77 is interrupted. The remaining of the tenth embodiment may be constructed in substantially the same manner as the seventh embodiment described above.

In the tenth embodiment constructed as described above, when the main poppet 17 is moved in a right direction from the normal position shown in FIG. 12, the inlet 76 and outlet 77 are communicated together through the annular groove 78. Thus, the metering valve of the tenth embodiment has wide applications because the main poppet 17 also serves as a change-over valve. Also, the metering valve of the embodiment not only carries out meter-out control but functions as both a relief valve and a suction valve as in the seventh embodiment described above.

Also, in the tenth embodiment, movement of the main poppet 17 from the normal position shown in FIG. 12 to the right direction, as described above, causes communication between the inlet 76 and the outlet 77. The communication is kept even when movement of the main poppet 17 is regulated due to contacting of the piston 55 with the stopper 57.

Figure 13:
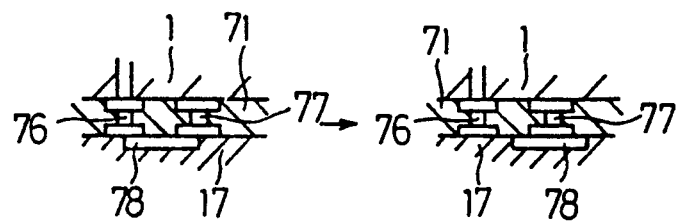
FIG. 13 is a fragmentary sectional view showing an eleventh embodiment of the present invention.

The present invention may be so constructed that the inlet 76 and outlet 77 are communicated to each other when the main poppet 17 is at the normal position and the communication is interrupted when the main poppet 17 is moved. FIG. 13 shows a metering valve of an eleventh embodiment according to the present invention which is constructed in such a manner as described above. More particularly, a left half of FIG. 13 shows a main poppet 17 kept at a normal position and its right half shows the main poppet 17 moved from the normal position. The remaining of the eleventh embodiment may be constructed in substantially the same manner as the tenth embodiment described above.

Figure 14:
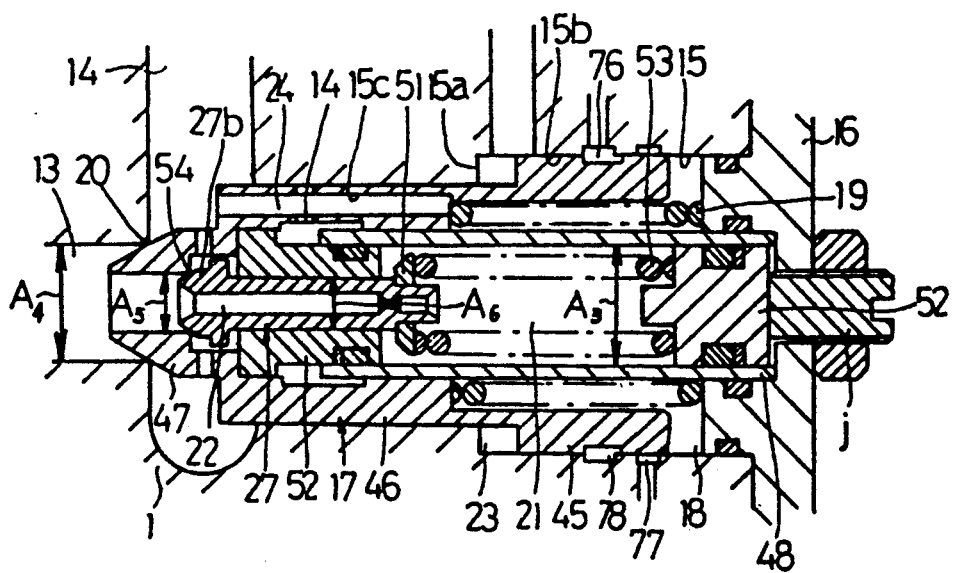
FIG. 14 is a fragmentary sectional view showing a twelfth embodiment of the present invention.

FIG. 14 shows a twelfth embodiment of a metering valve according to the present invention, wherein a valve hole 15 is formed with an inlet 75 and an outlet 76 in a manner to be spaced by a small distance from each other in an axial direction thereof and a large-diameter section of the main poppet 17 is formed with an annular groove 78. The inlet 76 and outlet 77 are communicated to each other through the annular groove 78 when a main poppet 17 is moved against a spring 19. The remaining of the twelfth embodiment may be constructed in substantially the same manner as the fourth embodiment described above with reference to FIG. 5. Accordingly, the twelfth embodiment permits the inlet 76 and outlet 77 to be operated depending on movement of the main poppet 17.

The manner of use of the metering valve of the present invention will be definitely described with reference to FIGS. 15 to 20.

Figure 15:
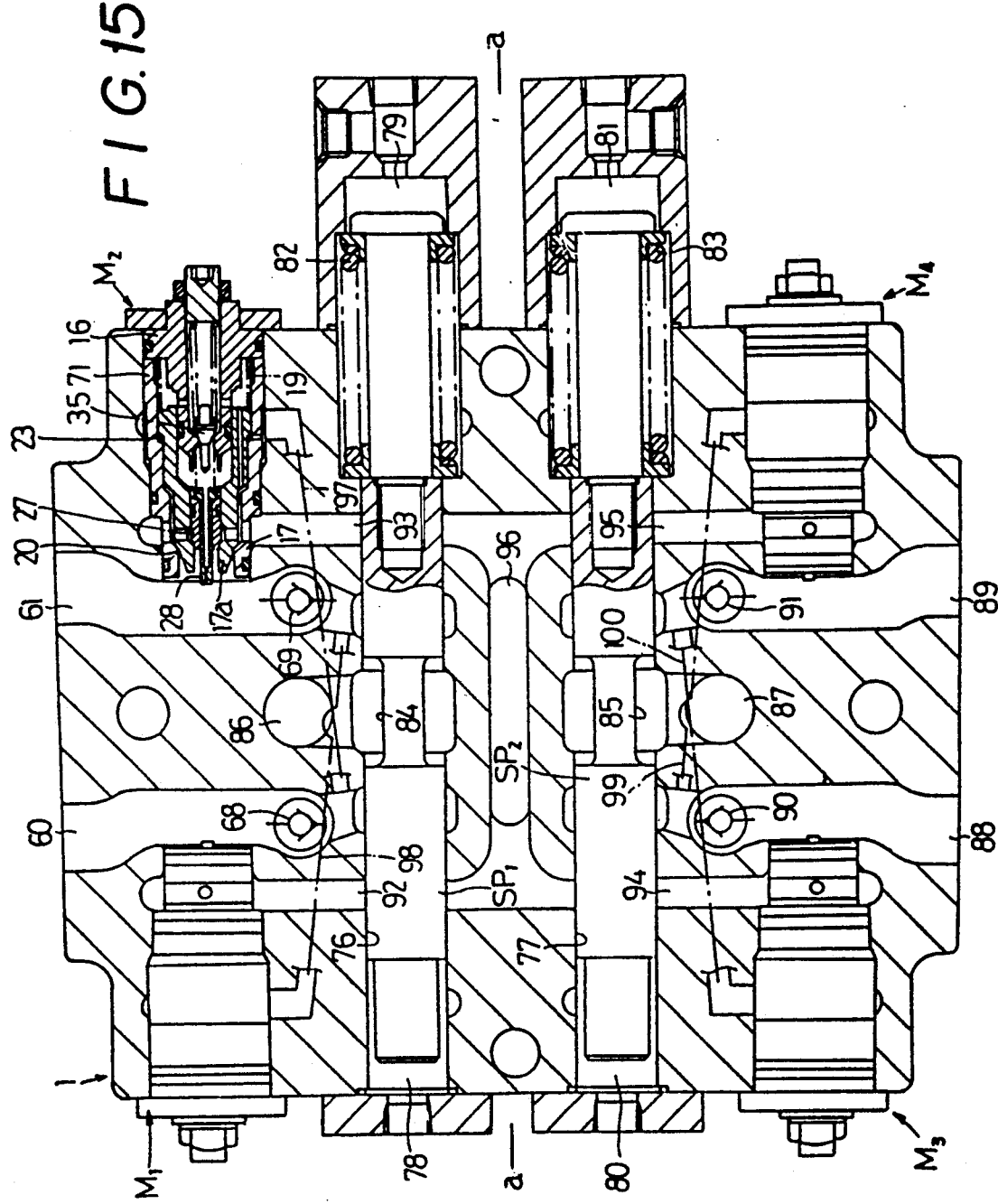
FIG. 15 is a fragmentary sectional view showing a thirteenth embodiment of the present invention.

FIG. 15 shows a thirteenth embodiment of the present invention, wherein a valve casing 1 is formed with a pair of spool holes 76 and 77, in which meter-in spools SP1 and SP2 are slidably arranged, respectively. The meter-in spools SP1 and SP2 are arranged at both ends thereof in pilot chambers 78 to 81, respectively. The pilot chambers 79 and 81 are provided therein with centering springs 82 and 83, respectively, so that the meter-in spools SP1 and SP2 each may be kept at a neutral position shown in FIG. 15.

The whole valve casing 1 in which a pair of the spools SP1 and SP2 and other elements are arranged is constructed in a manner to be line-symmetric along a center line a-a parallel to an axis of each of the spools SP1 and SP2. Accordingly, elements described hereinafter are arranged in pairs in a vertical direction, respectively.

The meter-in spools SP1 and SP2 are formed at central portions thereof with annular grooves 84 and 85, respectively, which are constantly communicated to pump ports 86 and 87. The pump ports 86 and 87 are connected to separate pumps (not shown). The pump ports 86 and 87 are formed on both sides thereof with actuator ports 60, 61 and 88, 89, respectively, which are provided with check valves 68, 69 and 90, 91 which permit only flow of fluid to an actuator, respectively.

The actuator ports 60, 61, 88 and 89 are formed on outsides thereof with return passages 92, 93, 94 and 95, respectively, which are communicated to a tank passage 96 formed along the center line a—a. Also, the actuator ports 60, 61, 88 and 89 are provided with metering valves M1 to M4, respectively. The metering valves M1 to M4 each are constructed in substantially the same manner as that of the eighth embodiment shown in FIG. 10 except that the second pilot chamber 56 is eliminated. Pilot chambers 23 of the metering valves are communicated through passages 97 to 100 to the actuator ports 60, 61, 88 and 89.

Thus, in the thirteenth embodiment, pressure at the actuator ports 60, 61, 88 and 89 is applied to the pilot chambers 23, so that each of main poppets 17 may be moved against a spring 19. Such movement of the main poppet 17 causes a poppet section 17a of the poppet 17 to open a seat 20 to communicate the actuator ports 60, 61, 88 and 89 to the return passages 92 to 95, respectively.

When pilot pressure is applied to the pilot chamber of one of the meter-in spools, for example, the pilot chamber 79 of the meter-in spool SP1, the spool SP1 is moved in a left direction in FIG. 15, so that the pump port 86 and actuator port 60 may be communicated to each other through the annular groove 84. This results in fluid discharged from a pump being supplied through the check valve 68 to the actuator. Also, at this time, pressure on a side of the actuator port 60 is guided through the passage 97 to the pilot chamber 23 to move the main poppet 17, to thereby keep the seat 20 at a degree of opening proportional to the supplied pressure. Accordingly, fluid returned from the actuator is flowed through the actuator port 61 through the seat 20 to the return passage 93 and then returned from the return passage 93 to the tank passage 96.

As can be seen from the foregoing, the meter-in side is controlled by the meter-in spool SP1 and the meter-out side is controlled by the metering valve M2. The meter-in spool SP1 is controlled in proportion to pilot pressure guided to the pilot chamber 79 and the metering valve M2 is controlled in proportion to pressure on a supply side.

Generation of load on the side of the actuator port 60 in the state described above causes pressure in the pilot chamber 23 of the metering valve M2 to be lowered, so that the spring 19 acts to move the main poppet 17 in a direction of closing the seat 20 to prevent, for example, a traveling actuator from running away.

When the pilot chamber 79 is communicated to a tank (not shown) after the actuator is actuated as described above, the centering spring 82 returns the meter-in spool SP1 to a neutral position shown in FIG. 15 and pressure in a pressure chamber 21 and force of the spring 19 cause the main poppet 17 to be returned to a position shown in FIG. 15.

Accordingly, at this time, both actuator ports 60 and 61 are closed with the check valves 68 and 69, the poppet section 17a of the metering valve, and a relief poppet 27. Closing of the actuator ports 60 and 61 with the poppet effectively prevents leakage of fluid therethrough, so that the load may be positively held.

In the thirteenth embodiment, each of the metering valves likewise carries out meter-out control and serves also as both a relief valve and a suction valve.

The above-described operation is carried out in substantially the same manner also when the meter-in spool SP2 is changed over.

Figure 16:
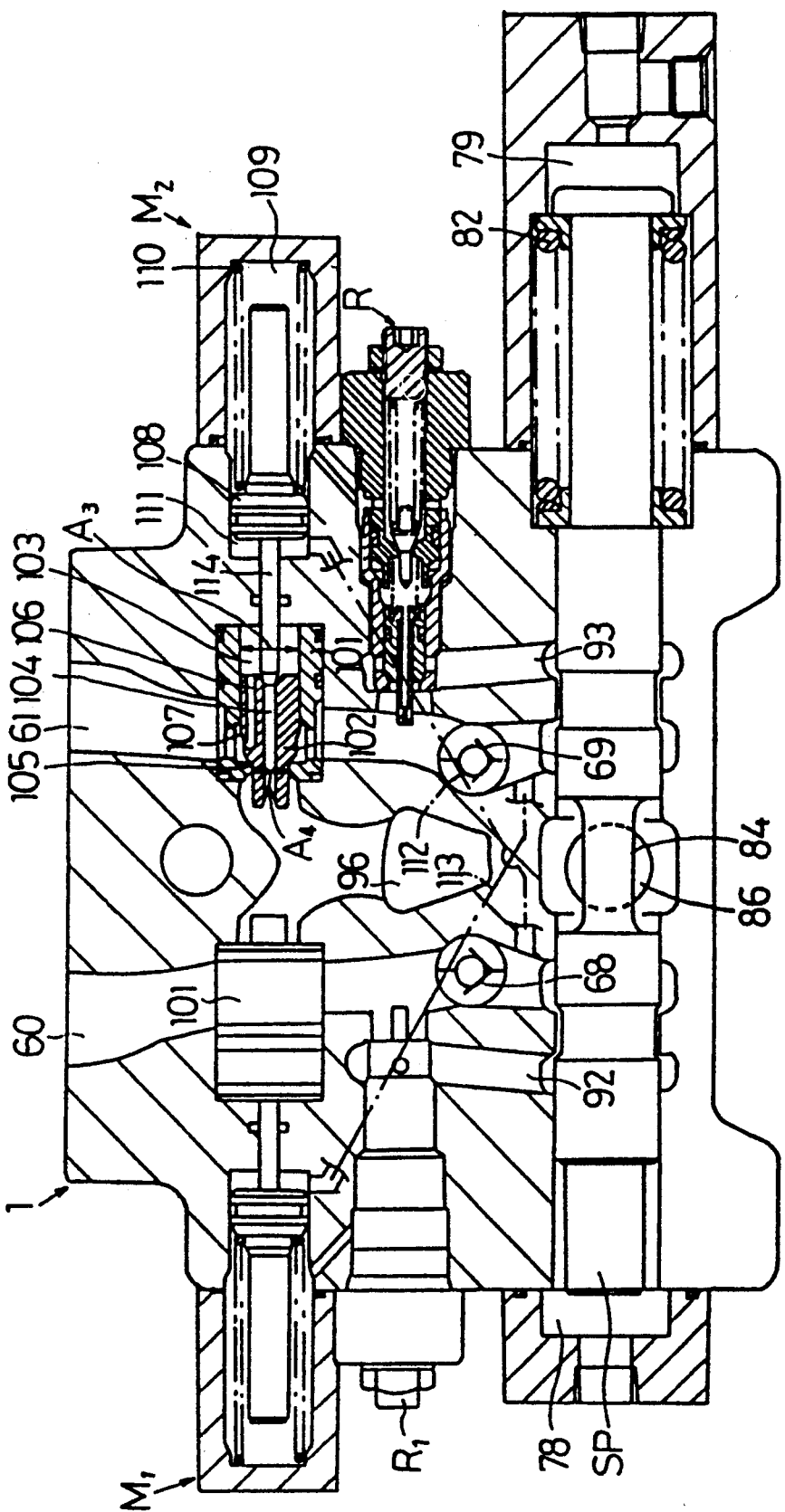
FIG. 16 is a fragmentary sectional view showing a fourteenth embodiment of the present invention.
Figure 17:
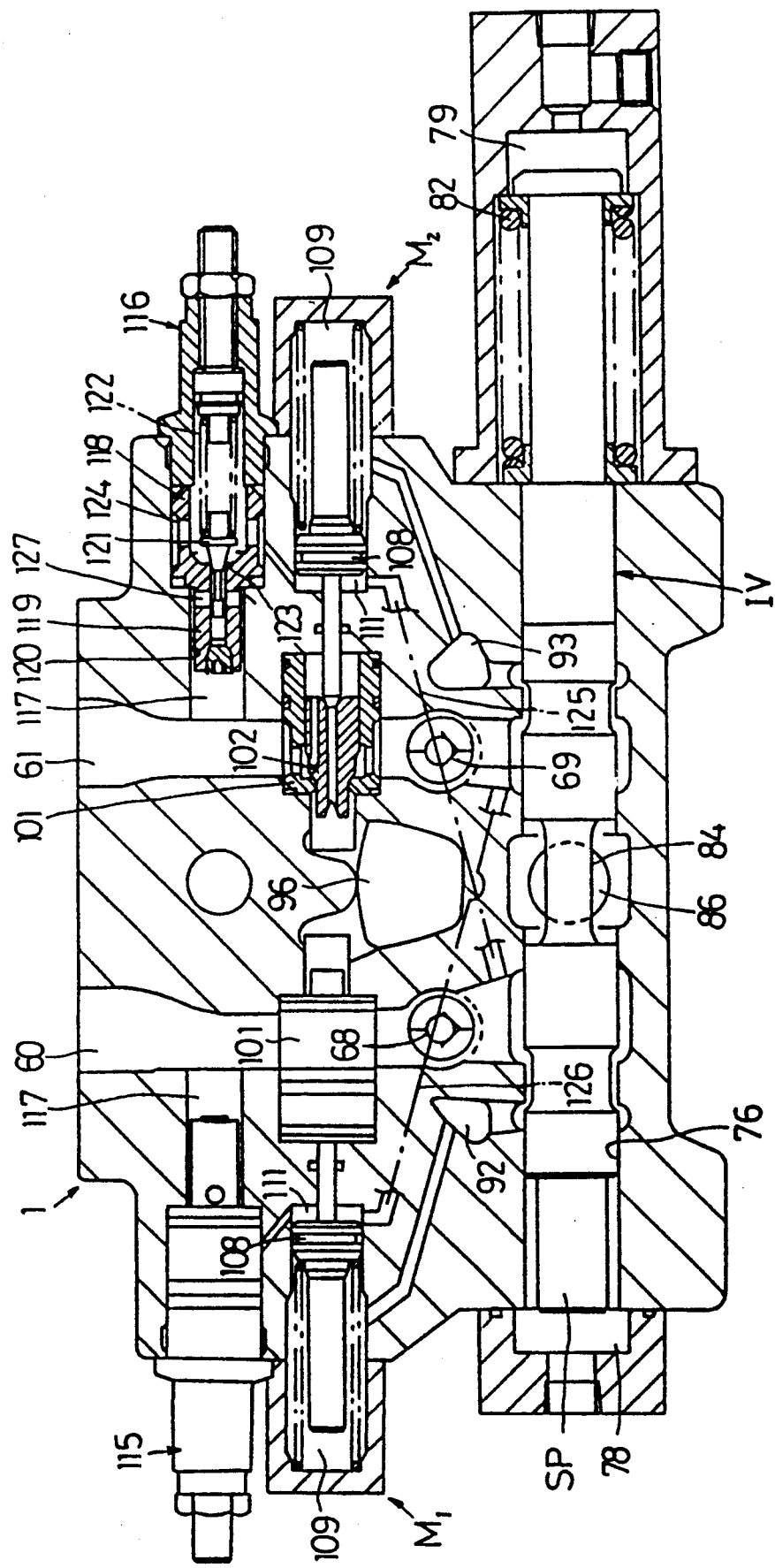
FIG. 17 is a fragmentary sectional view showing a fifteenth embodiment of the present invention.

FIGS. 16 and 17 show fourteenth and fifteenth embodiments, respectively, wherein a single device is incorporated in a valve casing.

In the fourteenth embodiment shown in FIG. 16, a metering valves M1 and M2 are arranged separate from a relief valve R also functioning as a suction valve. The metering valves M1 and M2 each are constructed in the substantially same manner.

The metering valves M1 and M2 are so arranged that cylindrical bodies 101 are fitted in a valve casing 1 in a manner to cross actuator ports 60 and 61. A poppet 102 is inserted in each of the cylindrical bodies 101. The poppet 102 is arranged in a manner such that one end thereof faces a tank passage 96 and the other end thereof faces a chamber 103, so that the tank passage 96 and chamber 103 may be communicated to each other via a through-hole or communication hole 104 formed in the poppet 102. In the so-constructed poppet 102, a pressure receiving area A4 on a side of the tank passage 96 determined depending on a diameter of a seat 105 of the cylindrical body 101 is defined to be larger than a pressure receiving area A3 on a side of the chamber 103.

The chamber 103 is communicated through a passage 106 and an orifice 107 to the corresponding actuator port 60 or 61. Also, the embodiment includes a servo piston 108 arranged on an outside of each of the poppets 102 in a manner to be coaxial therewith. On an outside of the servo piston 108 is formed a spring chamber 109 in which a spring 110 is arranged. On an inner side of the servo piston 108 is defined a pilot pressure chamber 111. The pilot pressure chambers 111 are communicated through passages 112 and 113 to the actuator ports 60 and 61, respectively.

Each of the servo pistons 108 is provided with a control rod 114 on a side of the pressure chamber 111, which is adapted to be normally contacted with an end of the through-hole 104 of the poppet 102 to close it, so that elastic force of the spring may act on also the poppet 102 to pressedly contact the poppet 102 with a seat 105 to close it. The relief valve R is constructed in substantially the same manner as that in the thirteenth embodiment described above.

In the fourteenth embodiment constructed as described above, pilot pressure is applied to a pilot chamber 79 of a meter-in spool SP, the meter-in spool SP is moved in a left direction in FIG. 16 in proportion to the pilot pressure to communicate a pump port 86 to the actuator port 60 to supply pressure fluid from the port 60 to an actuator (not shown). The pressure is also applied to the pilot pressure chamber 111 of the metering valve M2 through the passage 112. This causes the servo piston 108 to be moved to a position at which the pressure is balanced with elastic force of the spring 110.

Movement of the servo piston 108 as described above moves the control rod 114 in a direction away from the poppet 102 to open the through-hole 104. Opening of the through-hole 104 causes pressure fluid on a side of the actuator port 61 to be flowed to the tank passage 96 through the orifice 107, passage 106, chamber 103 and through-hole 104 in turn. This leads to a difference in pressure between both sides of the orifice 107 to move the poppet 102 to a position toward the chamber 103, resulting in the seat 105 being opened. Such movement of the poppet 102 causes the end of the through-hole 104 to approach the control rod 114 to reduce a degree of opening of the end, so that a difference in pressure between an upstream side of the orifice 107 and the chamber 103 may be decreased to keep the poppet 102 balanced at the position.

Thus, in the fourteenth embodiment as well as the thirteenth embodiment described above, a flow rate of fluid on a meter-in side due to movement of the meter-in spool SP is controlled by pilot pressure guided to the pilot chamber 79 and the flow rate on an meter-out side due to movement of the poppet 102 of the metering valve is controlled by the supplied pressure.

When negative load is generated on the side of the actuator port 60 in the state described above, pressure in the pilot pressure chamber 111 of the metering valve M2 is correspondingly decreased, so that the spring 110 moves the servo piston 108 toward the original position. This causes the meter-out poppet 102 to be moved in a direction of closing the seat 105, to thereby prevent, for example, an actuator from running away.

When the pilot chamber 79 is communicated to a tank after the actuator is actuated as described above, the meter-in spool SP is returned to its neutral position and the servo piston 108 and poppet 102 of the metering valve are returned to positions shown in FIG. 16. Thus, the actuator ports 60 and 61 are closed with the check valves 68 and 69, poppet 102, and relief valve R as in the thirteenth embodiment described above. Thus, the actuator ports 60 and 61 each are fully closed with the poppet, to thereby prevent leakage therethrough and positively hold the load.

In a fifteenth embodiment shown in FIG. 17, metering valves M1 and M2 are constructed in substantially the same manner as in the fourteenth embodiment described above and direct operated relief valves 115 and 116 are provided separate from the metering valves M1 and M2. The direct operated relief valves 115 and 116 are constructed in substantially the same manner.

Each of the direct operated relief valves includes a seat member 118 having a projection 119 provided at a tip end thereof and inserted in a communication hole 117. Between the communication hole 117 and the projection 119 is defined a passage 120. In the seat member 118 is arranged a relief poppet 121, on which a spring 122 acts so as to pressedly contact the relief poppet 121 with a seat 123.

The relief valve is provided with an outflow port 124, which is communicated to a pilot pressure chamber 111 of a metering valve. The pilot pressure chamber 111 is communicated through passages 125 and 126 to an actuator port 60 on a side opposite to the actuator port to which the communication hole 117 is opened.

When pressure on a side of the actuator port is increased to a level above pressure predetermined by the direct operated relief valve, the pressure is applied through the passage 120 and a port 127 to the relief poppet 121 to move the poppet 121 against the spring 122. Such movement of the relief poppet 121 opens the seat 123, so that pressure on a side of an actuator port 61 may be applied to a pilot pressure chamber 111 of a servo piston 108 to move the servo piston 108. Movement of the servo piston 108 opens a poppet 102 to escape fluid on the side of the actuator port 61 toward a tank passage 96 in a manner similar to the fourteenth embodiment described above.

The remaining of the fifteenth embodiment may be constructed in substantially the same manner as the fourteenth embodiment.

Figure 18:
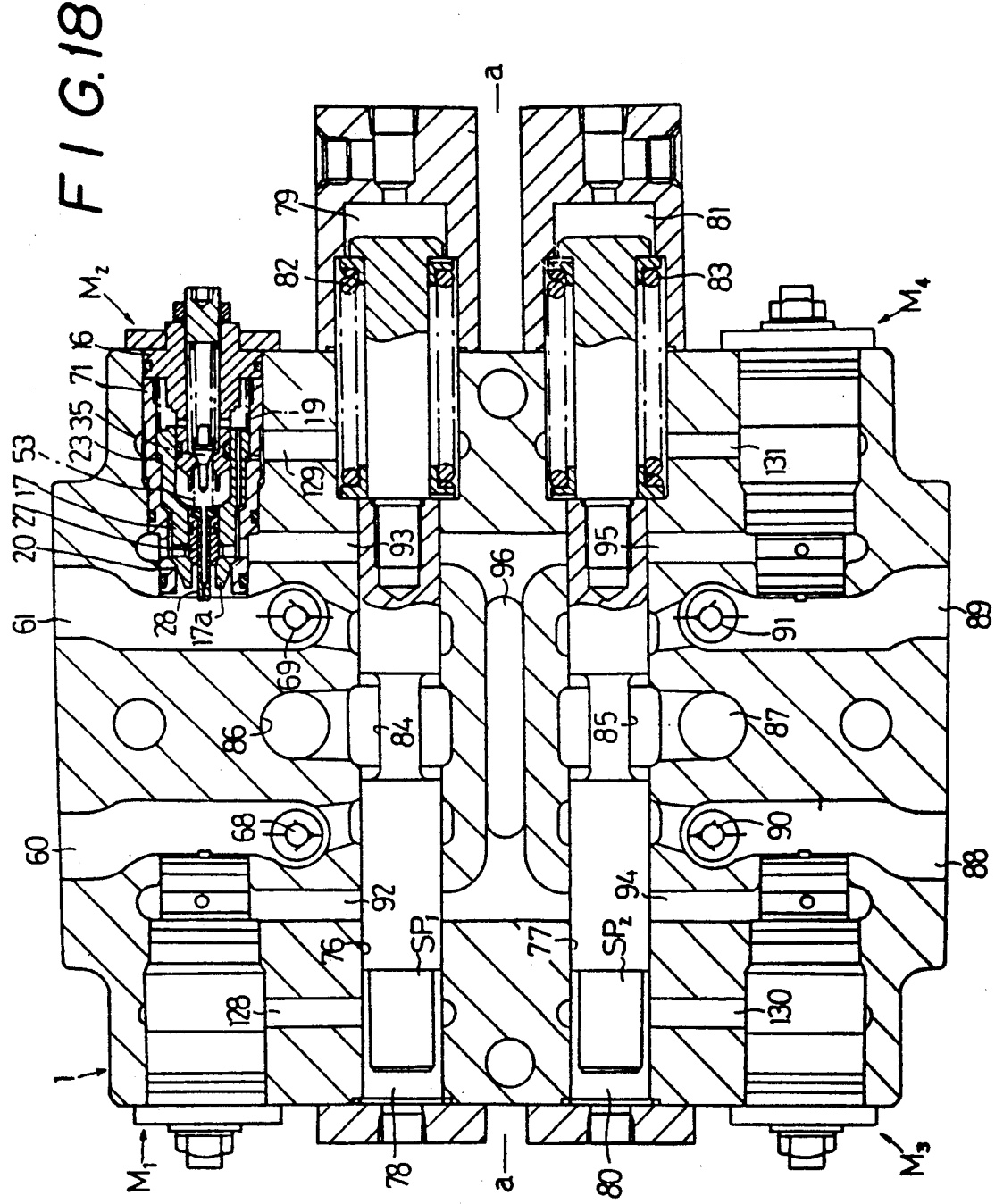
FIG. 18 is a fragmentary sectional view showing a sixteenth embodiment of the present invention.

FIG. 18 shows a sixteenth embodiment of the present invention, which is constructed in substantially the same manner as the thirteenth embodiment described above, except arrangement of passages.

More particularly, in the sixteenth embodiment, each pilot chamber 23 formed on an outer periphery of a main poppet 17 is communicated through each of passages 128-131 to each of pilot chambers 78-81. Accordingly, when pressure is applied to each of the pilot chambers 78-81, it is also applied to the pilot chamber 23 to move the main poppet 17 against a spring 19. This causes a seat 20 to be opened to communicate actuator ports 60-89 to passages 92-95.

Pilot pressure is applied to a pilot chamber of one of meter-in spools, for example, a pilot chamber 79 of a meter-in spool SP1, the spool SP1 is moved in a left direction in FIG. 18, so that a pump port 86 and an actuator port 60 may be communicated to each other through an annular groove 84. Such communication between both ports 86 and 60 causes fluid discharged from a pump (not shown) to be supplied through a check valve 68 to an actuator (not shown). At this time, pilot pressure applied to the pilot chamber 79 is also applied through the passage 129 to the pilot chamber 23 to move the main poppet 17, resulting in the seat 20 being kept at a degree of opening in proportion to the pilot pressure. This results in fluid returned from the actuator being flowed from the other actuator port 61 through the seat 20 to the return passage 93 and then returned through a tank passage 96 to a tank (not shown).

Figure 19:
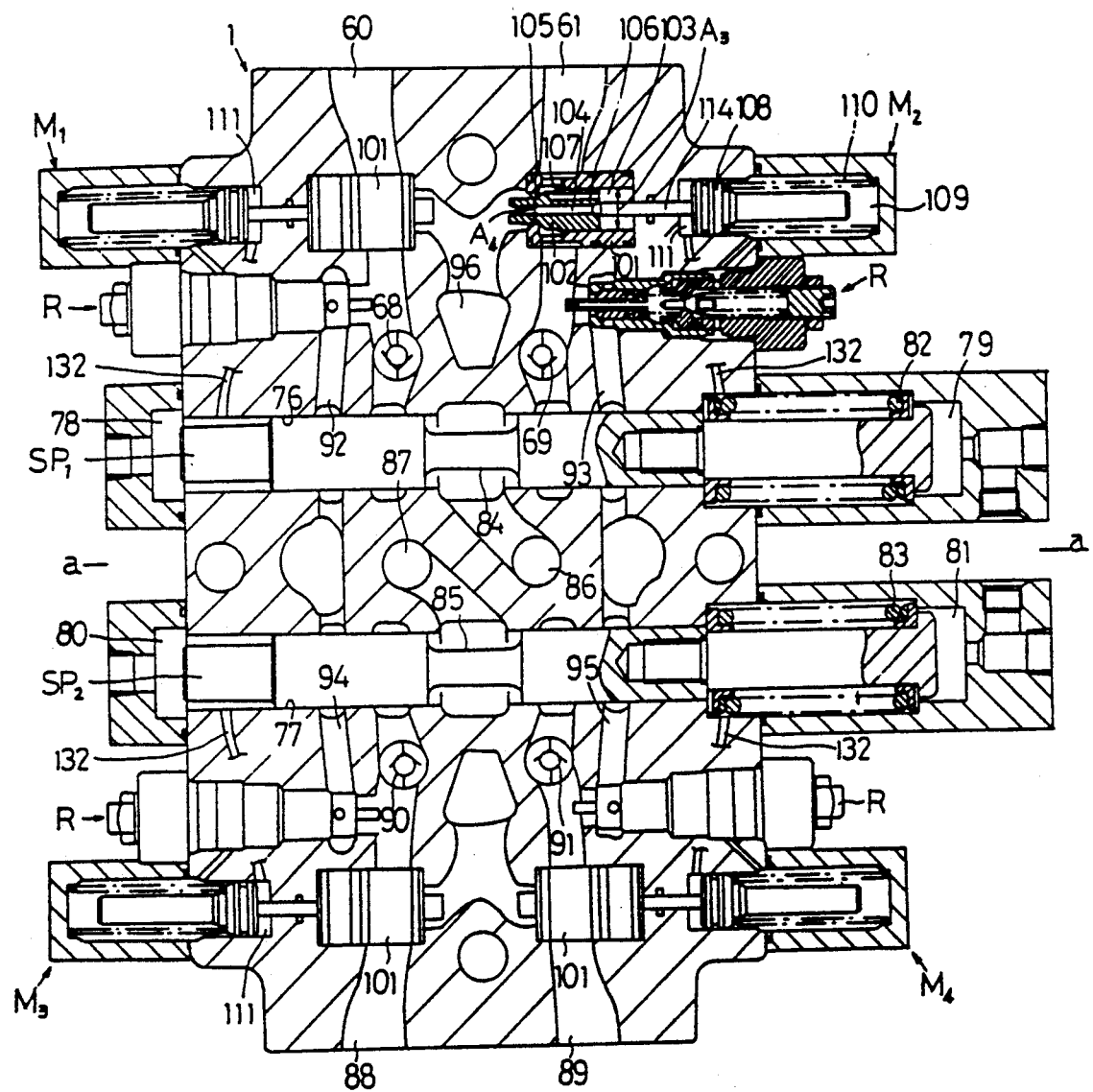
FIG. 19 is a fragmentary sectional view showing a seventeenth embodiment of the present invention.

FIG. 19 shows a seventeenth embodiment of the present invention, wherein metering valves M1 to M4 and a relief valve R are arranged separate from each other and each of the valves is constructed in substantially the same manner as the fourteenth embodiment described above, except that it is line-symmetric about a center line a—a parallel to an axis of each of meter-in spools SP1 and SP2 and a pilot pressure chamber 111 of a servo piston 108 is communicated through a passage 132 to a pilot chamber 79.

In the seventeenth embodiment, when pilot pressure is applied to the pilot chamber 79 of the meter-in spool SP1, the spool SP1 is moved in a left direction in FIG. 19 in proportion to the pilot pressure to communicate a pump port 86 and an actuator port 60 to each other, resulting in pressure fluid being supplied from the port 60 to an actuator (not shown). Pilot pressure applied to the pilot chamber 79 is also applied through the passage 132 to the pilot pressure chamber 111 of the servo piston 108. This causes the servo piston 108 to be moved to a position at which the pilot pressure and elastic force of the spring 110 are balanced with each other.

Such movement of the servo piston 108 causes its control rod 114 to be moved in a direction away from a poppet 102 to open a through-hole 104. This results in pressure fluid on a side of an actuator port 61 being flowed to a tank passage 96 through an orifice 107, a passage 106, a chamber 103 and the through-hole 104 in turn. This leads to a difference in pressure between both sides of the orifice 107, so that the poppet 102 may be moved to a position toward the chamber 103 to open a seat 105. Movement of the poppet 102 causes an end of the through-hole 104 to approach the control rod 114 to lead to constriction of the through-hole 104. This results in a difference in pressure between an upstream side of the orifice 107 and the chamber 103 being reduced to stop the poppet 102 at the position.

Thus, it will be noted that the seventeenth embodiment likewise is adapted to control both a flow rate on a meter-in side due to movement of the meter-in spool SP1 and a flow rate on a meter-out side due to movement of the poppet 102 of the metering valve by means of pilot pressure applied to the pilot chamber 79.

When the pilot chamber 79 is communicated to a tank after the actuator is operated as described above, the meter-in spool SP1 is returned to its neutral position and the servo piston 108 and poppet 102 of the metering valve are returned to positions shown in FIG. 19.

FIG. 20 shows an eighteenth embodiment of the present invention, wherein metering valves M1 to M4 are constructed in substantially the same manner as in the seventeenth embodiment described above and a direct operated relief valve R' is arranged separate from the metering valves M1 to M4. The direct operated relief valve R is constructed in substantially the same manner as that in the fifteenth embodiment described above with reference to FIG. 17.

In the eighteenth embodiment, an outflow port 134 of each of relief valves 115 and 116 is communicated to a pilot chamber 111 of the metering valve, which is then communicated through a passage 132 to pilot chambers 79 and 81. The passage 132 is provided with a restriction 133.

When pressure on a side of an actuator port exceeds a set value determined by the direct operated relief valve, it is applied through a passage 120 and a port 127 to a relief poppet 121 to move the poppet 121 against a spring 122. Movement of the poppet 121 opens a seat 123 to flow pressure fluid on the side of the actuator port through the passage 120, the port 127, an outflow port 124 and the restriction 133. Flowing of fluid through the restriction 133 leads to a difference in pressure on both sides of the restriction 133, so that pressure on an upstream side of the restriction 133 moves the servo piston 108. This results in the poppet 102 being opened to escape fluid on a side of an actuator toward a tank passage 96.

As described above, each of the embodiments is so constructed that the pressure receiving area A3 of the pressure chamber of the metering valve is defined to be slightly or somewhat larger than the pressure receiving area A4 of the seat. Such construction not only causes the main poppet to constantly close irrespective of a variation of pressure on the side of the actuator port when pressure on the side of the actuator port is applied to both pressure receiving areas and but stably accomplished meter-out control.

While preferred embodiments of the invention have been described with a certain degree of particularity with reference to the drawings, obvious modifications and variations are possible in the light of the above teachings. It is therefore to be understood that within the scope of the appended claims, the invention may be practiced otherwise than as specifically described.

What is claimed is:

1. A metering valve comprising: a valve casing;
a main poppet arranged in said valve casing and provided with a poppet section; and
a seat provided on a side of an actuator port in said valve casing;
said poppet section of said main poppet operating said seat to selectively communicate said actuator port to a tank passage;
said main poppet being formed with a pressure chamber at a portion thereof opposite to said poppet section;
said pressure chamber having a pressure receiving area substantially equal to that on a side of said seat;
said main poppet being formed with a through-hole constantly communicated to said actuator port;
said main poppet being formed with a pilot chamber to which pilot pressure for moving said main poppet in a direction of opening said seat is applied.

2. Circuit for at least one metering valve, comprising a valve casing (1) provided with a meter-in valve (IV), a pump port (58) and a tank port (59) formed on an upstream side of said meter-in valve (IV),
actuator ports (60, 61) formed on a downstream side of said meter-in valve (IV) and which respectively communicate with a bottom side of an arm cylinder (C) and a chamber (63) on a rod side thereof;
pilot chambers (64, 65) connected to both ends of said meter-in valve (IV), and to which pilot pressure is applied from pilot lines (66, 67);
each said actuator port (60, 61) being provided with a check valve (68, 69) arranged to communicate with said arm cylinder (c) only from a side of said meter-in valve (IV);
said valve casing (1) additionally being provided with a pair of metering valves ((M1, M2) constructed in the same manner as one another;
each said metering valve (M1, M2) including a main poppet (17) and a guide plug (16), between which a pressure chamber (21) is defined, and a spring (19) arranged to act on said pressure chamber (21);
said pressure chamber (21) comprising a pressure receiving area (A3) slightly larger than a pressure receiving area (A4) determined depending upon a diameter of a seat (20);
said pressure chamber (21) communicating through a communication hole (22) with an inflow port (13) which, in turn, communicates with a respective one of said actuator ports (60, 61) on a downstream side of said respective check valve (68, 69);
whereby pressure in said actuator ports (60, 61) act on both said pressure receiving areas (A3, A4) of each said metering valve;
each said metering valve (M1, M2) also being provided with first and second pilot chambers (23, 56), such that force applied to said first pilot chamber (23) causes said main poppet (17) to be moved to is open direction, and while force applied to said second pilot chamber (56) causes said main poppet (17) to move to its closed direction;
said first pilot chamber (23) of each said metering valve (M1, M2) communicating with said pilot chambers (64, 65) of said meter-in valve (IV), and said second pilot chamber (56) of each said metering valve (M1, M2) communicating with a pilot chamber of a meter-in valve on a side of a swing motor.

3. The combination of claim 2, wherein each said metering valve (M1, M2) additionally comprises a cylindrical body (71) fitted in a valve hole (15) formed in a casing (12) of said metering valve, and a guide plug (16) fitted in an outer end of said cylindrical body (71), to prevent said cylindrical body (71) from being released from said valve hole (15);

said cylindrical body (71) being formed with a hollow portion in which said main poppet (17) is slidably fitted on a guide section (16a) of said guide plug;

a piston chamber being defined around said guide section (16a) of said guide plug (16), and in which a piston (55) is slidably inserted;

said first pilot chamber (56) of said metering valve being defined on an outside of said piston (55), and a spring chamber (18) being defined on an inside of said piston (55), with said spring (19) being interposed in said spring chamber (18) between said main poppet (17) and said piston (55);

a portion of said cylindrical body (71) positioned in said spring chamber (18) being formed on an inner surface thereof with a step (57) service as a stopper, which is adapted to regulate a maximum stroke of said piston (55);

said spring chamber (18) communicating with an outflow port (14) through a communication hole (24) formed in said main poppet (17) and a flow passage (72) formed between said main poppet (17) and said cylindrical body (71);

said second pilot chamber (23) being defined around an outer periphery of said main poppet (17); and a relief poppet (27) slidably inserted in said main poppet (17).

4. The combination of claim 2, wherein each said meter valve (M1, M2) comprises said second pilot chamber (56) being defined around said main poppet (17) in a manner opposite to said first pilot chamber (23); and said first pilot chamber (23) having a pressure receiving area defined to be larger than a pressure receiving area of said second pilot chamber (56);

whereby application of pilot pressure to only said first pilot chamber (23) causes said main poppet (17) to move depending upon the pilot pressure to determine a degree of opening of said seat (20).

5. The combination of claim 2, wherein each said metering valve (M1, M2) comprises a port (73) for introducing pilot pressure into a spring chamber (18) formed with a first orifice (75) and a communication hole (24) for communicating said spring chamber (18) with an outflow port (14) formed with a second orifice (74).

6. Metering Valve Structure comprising a pair of metering valves (M1, M2) arranged in a valve casing separate from a relief valve (R) also functioning as a suction valve;

said metering valve (M1, M2) being constructed substantially identically;

said metering valves (M1, M2) each comprising a cylindrical body (101) fitted in said valve casing (1) in a manner to cross actuator ports (60, 61), and having a poppet (102) inserted in each of said cylindrical bodies (101);

said poppet (102) being arranged in a manner such that one end thereof faces a tank passage (96) and an opposite end thereof faces a chamber (103), such that said tank passage (96) and chamber (103) may communicate with one another via a through-hole or communication hole (104) formed in said poppet (102);

said poppet (102) comprising a pressure-receiving area (A4) on a side of said tank passage (96) determined by a diameter of a seat (105) of said cylindrical body (101), and larger than a pressure receiving ara (A3) on a side of said chamber (103);

said chamber (103) communicates with said corresponding actuator port (60, 61) through a passage (106) and an orifice (107);

a servo piston (108) being arranged on an outside of each of said poppets (102) in a coaxial manner therewith;

a spring chamber (109) being formed on an outside of said servo piston (108) in which a spring (110) is arranged;

a pilot pressure chamber (111) being defined on an inner side of said servo piston (108);

said pilot pressure chambers (111) communicating through passages (112, 113) with said respective actuator ports (60, 61);

each of said servo pistons (108) being provided with a control rod (114) on a side of said pressure chamber (111) which is disposed to normally seat in an end of said through-hole (104) of said poppet (102) to close the same, so that elastic force of said spring (110) may also act on said poppet (102) to press said poppet (102) into contact with a seat (105) to close the same;

a pair of direct-operated relief valves (115, 116) provided separately from said metering valves (M1, M2) and constructed substantially identically;

each said direct-operated relief valve including a seat member (118) having a projection (119) provided at a tip end thereof and inserted in a communication hole (117);

a passage (120) being defined between said communication hole (117) and said projection (119);

a relief popped (121) being arranged in said seat member (118) and on which a spring (122) acts so as to press said relief poppet (121) into contact with a seat (123);

each said relief valve being provided with an outflow port (124) which communicates with one of said pilot pressure chambers (111) of said metering valves.

7. The combination of claim 6, comprising four metering valves (M1, M4) being line-symmetric about a center line (a-a) parallel to an axis of each of meter-in spools (SP1, SP2), and said pilot pressure chamber (111) of said servo piston (108) communicating through a passage (132) with a respective pilot chamber (79) of said meter-in spools (SP1, SP2).

8. The combination of claim 7, additionally comprising a pair of relief valves (115, 116), each said relief valve comprising an outflow port (134) communicating with a respective pilot chamber (111) of one of said metering valves, which, in turn, communicates through said passage (132) provided with a restriction (133) with said spool pilot chambers (79, 81).

* * * * *